(12) United States Patent
Nakashima et al.

(10) Patent No.: US 11,974,110 B2
(45) Date of Patent: Apr. 30, 2024

(54) SPEAKER DIAPHRAGM

(71) Applicant: Yamaha Corporation, Hamamatsu (JP)

(72) Inventors: Hiroshi Nakashima, Hamamatsu (JP); Eiji Abe, Iwata (JP); Kunio Hiyama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 415 days.

(21) Appl. No.: 17/308,562

(22) Filed: May 5, 2021

(65) Prior Publication Data

US 2021/0258693 A1 Aug. 19, 2021

Related U.S. Application Data

(63) Continuation of application No. PCT/JP2019/041477, filed on Oct. 23, 2019.

(30) Foreign Application Priority Data

Nov. 6, 2018 (JP) .................. 2018-209277

(51) Int. Cl.
H04R 7/12 (2006.01)
B32B 27/06 (2006.01)
B32B 27/32 (2006.01)
H04R 31/00 (2006.01)

(52) U.S. Cl.
CPC ............ *H04R 7/122* (2013.01); *B32B 27/06* (2013.01); *B32B 27/32* (2013.01); *H04R 31/003* (2013.01); *B32B 2250/03* (2013.01); *B32B 2250/40* (2013.01); *B32B 2270/00* (2013.01); *H04R 2307/025* (2013.01)

(58) Field of Classification Search
CPC .............. H04R 7/122; H04R 31/003; H04R 2307/025; B32B 27/06; B32B 27/32; B32B 2250/03; B32B 2250/40; B32B 2270/00
USPC ........................................ 181/167
See application file for complete search history.

(56) References Cited

U.S. PATENT DOCUMENTS 10,250,970 B2 * 4/2019 Tanabe ................... H04R 7/122
11,019,443 B2 * 5/2021 Yoshioka ................ H04R 9/06
(Continued)

FOREIGN PATENT DOCUMENTS

| CN | 1913722 A | 2/2007 |
| JP | 62-253300 A | 11/1987 |
| JP | 2-276399 A | 11/1990 |

(Continued)

OTHER PUBLICATIONS

English Translation of Written Opinion (PCT/ISA/237) issued in PCT Application No. PCT/JP2019/041477 dated Dec. 17, 2019 (four (4) pages).

(Continued)

*Primary Examiner* — Forrest M Phillips
(74) *Attorney, Agent, or Firm* — Crowell & Moring LLP

(57) ABSTRACT

A speaker diaphragm includes a first polymer and a second polymer. The first polymer and the second polymer undergo phase separation. The first polymer is a polyolefin, and the second polymer is a thermoplastic resin being immiscible with the polyolefin. One of either the polyolefin or the thermoplastic resin constitutes a sea phase, and another one of either the polyolefin or the thermoplastic resin constitutes island phases being interspersed in the sea phase.

12 Claims, 5 Drawing Sheets

(56) References Cited

U.S. PATENT DOCUMENTS

2007/0034443 A1    2/2007   Tokura et al.
2011/0284317 A1 *  11/2011  Mitani .................. H04R 7/127
                                                          264/328.18

FOREIGN PATENT DOCUMENTS

| JP | 2004-15194 A | 1/2004 |
| JP | 2017222972 A * | 12/2017 |
| WO | WO 2010/095704 A1 | 8/2010 |
| WO | WO-2017030192 A1 * | 2/2017 ............. H01L 41/09 |

OTHER PUBLICATIONS

Chinese-language Office Action issued in Chinese Application No. 201980073142.1 dated Aug. 2, 2022 with English translation (12 pages).
Chinese-language Office Action issued in Chinese Application No. 201980073142.1 dated January 6, 20212with English translation (16 pages).
Extended European Search Report issued in European Application No. 19883180.2 dated Jul. 7, 2022 (nine (9) pages).
Japanese-language Office Action issued in Japanese Application No. 201980073142.1 dated Aug. 2, 2022 with English translation (12 pages).
International Search Report (PCT/ISA/210) issued in PCT Application No. PCT/JP2019/041477 dated Dec. 17, 2019 with English translation (five (5) pages).
Japanese-language Office Action issued in Japanese Application No. 2018-209277 dated Jul. 27, 2022 with English translation (six (6) pages).

* cited by examiner

SPEAKER DIAPHRAGM

CROSS-REFERENCE TO RELATED APPLICATIONS

This application is a continuation application of International Application No. PCT/JP2019/041477, filed on Oct. 23, 2019, which claims priority to Japanese Patent Application No. 2018-209277 filed in Japan on Nov. 6, 2018. The entire disclosures of International Application No. PCT/JP2019/041477 and Japanese Patent Application No. 2018-209277 are hereby incorporated herein by reference.

BACKGROUND

The present disclosure relates to a speaker diaphragm. Recently, in light of attempts to, for example, improve moisture resistance and reduce weight, speaker diaphragms in which a synthetic resin is employed in place of wood have been used.

SUMMARY

A conventional speaker diaphragm has a cone shape, and can be obtained by injecting a molten resin into a cavity of a die from a central part of the cavity (a part corresponding to a bottom of the speaker diaphragm) and conducting injection molding.

This speaker diaphragm is formed by curing the resin which has been injected into and flowed within the cavity. Thus, in the case of this speaker diaphragm, it is difficult to control anisotropy of an elastic modulus due to a molecular orientation which results from the flow of the resin.

The prevent disclosure was made in view of the aforementioned problem, and an object of the present disclosure is to provide a speaker diaphragm in which an elastic modulus can be readily controlled.

A speaker diaphragm according to one aspect of the present disclosure made for solving the aforementioned problem contains a first polymer and a second polymer. The first polymer and the second polymer undergo phase separation, and the first polymer is a polyolefin and the second polymer is a thermoplastic resin being immiscible with the polyolefin. One of either the polyolefin or the thermoplastic resin constitutes a sea phase, and another one of either the polyolefin or the thermoplastic resin constitutes island phases being interspersed in the sea phase. Other objects, features, advantages, as well as the technical and industrial significance of the present disclosure will be better understood by reading the following detailed description of embodiments, when considered in connection with the accompanying drawings, in which:

DETAILED DESCRIPTION

The speaker diaphragm according to one aspect of the present disclosure contains a first polymer and a second polymer, wherein the first polymer and the second polymer undergo phase separation, the first polymer is a polyolefin and the second polymer is a thermoplastic resin being immiscible with the polyolefin, and one of either the polyolefin or the thermoplastic resin constitutes a sea phase, and another one of either the polyolefin or the thermoplastic resin constitutes island phases being interspersed in the sea phase.

The speaker diaphragm may have a cone shape. A difference between a melting point of the polyolefin and a melting point of the thermoplastic resin is preferably 20° C. or less. The polyolefin is preferably polymethylpentene. The thermoplastic resin is preferably a liquid crystal polymer. In the speaker diaphragm, the island phases are preferably present in surface layers in a radial form. The speaker diaphragm preferably further contains polyparaphenylenebenzobisoxazole fibers. It is to be noted that the "melting point" as referred to herein means a peak melting point temperature measured by differential scanning calorimetry (DSC) in accordance with JIS-K7121:2012 (testing methods for transition temperatures of plastics).

Due to the first polymer and the second polymer undergoing phase separation from each other, anisotropy of an elastic modulus due to a molecular orientation of one of either the first polymer or the second polymer can be controlled by the other one of either the first polymer or the second polymer. It is to be noted that "anisotropy of an elastic modulus" as referred to herein means a property in which the elastic modulus differs in a direction of intersection, and in the case of the speaker diaphragm of the one aspect of the present disclosure having the cone shape, "anisotropy of the elastic modulus" means a property in which the elastic modulus in a radial direction differs from that in a circumferential direction.

Hereinafter, embodiments of the present disclosure will be described in detail with reference to a drawing or drawings as appropriate. The speaker diaphragm in FIGS. 1 and 2 contains a first polymer and a second polymer which undergo phase separation from each other.

In the inventive speaker diaphragm, the first polymer is a polyolefin, and the second polymer is a thermoplastic resin being immiscible with the polyolefin. In the speaker diaphragm, the thermoplastic resin constitutes a sea phase 1a, and the polyolefin constitutes island phases 1b being interspersed in the sea phase 1a. In other words, with regard to the speaker diaphragm, blending the first polymer and the second polymer results in phase separation into the two phase types, being the sea phase 1a and the island phases 1b.

Figure 1:
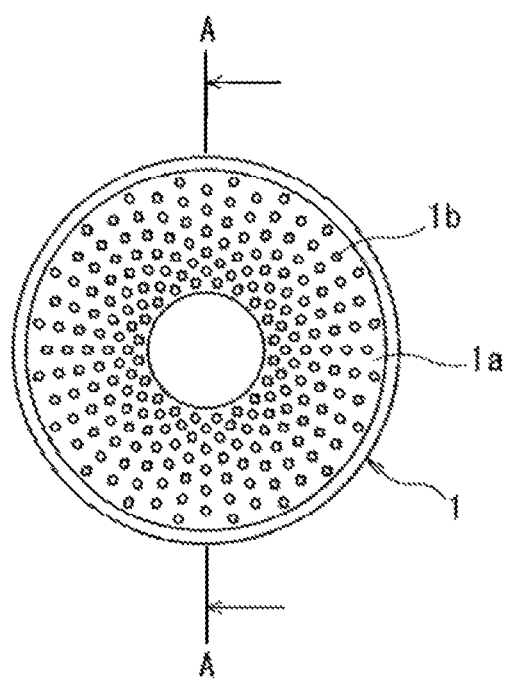
FIG. 1 is a schematic front view of a speaker diaphragm.
Figure 2:
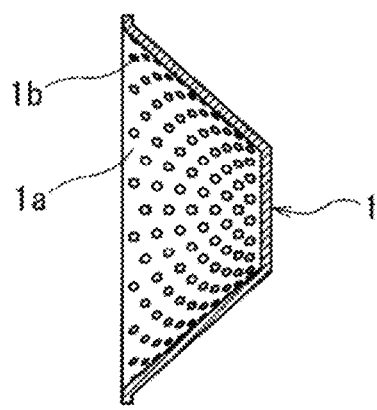
FIG. 2 is a cross-sectional view of the speaker diaphragm, taken along A-A in FIG. 1.

The speaker diaphragm can be configured to be in a shape in accordance with a speaker to be used, and in FIGS. 1 and 2, the speaker diaphragm has the cone shape. Furthermore, a size of the speaker diaphragm can be set in accordance with the speaker to be used. The speaker diaphragm may be for use in a small speaker to be provided in, for example, headphones, earphones, portable electronic devices, or the like. It is to be noted that the "cone shape" as referred to herein means a shape having a cylindrical circumferential wall that expands in diameter from a back side toward a front side with respect to a central axial direction, and this shape may include a bottom which closes an end opening on the back side of the circumferential wall. Furthermore, the "front side" as referred to herein means a side of a sound-emitting direction, and the "back side" as referred to herein means a side being opposite to the front side. The speaker diaphragm may have a shape in which only a part expands in diameter from the back side toward the front side with respect to the central axial direction of the circumferential wall, but the entire circumferential wall expanding in diameter from the back side toward the front side with respect to the central axial direction is preferred.

The speaker diaphragm has a base layer 1 containing the sea phase 1a and the island phases 1b being interspersed in the sea phase 1a. The speaker diaphragm, is a single-layer body of the base layer 1. The base layer 1 can be formed by injection molding, described later. The base layer 1 may have: a pair of skin layers disposed respectively on the front side and the back side, which come into contact with the cavity of the die; and a core layer being disposed between the skin layers and having a molecular orientation which differs from that of the skin layers.

The speaker diaphragm has substantially uniform thickness. The lower limit of an average thickness T of the speaker diaphragm is preferably 50 μm, and more preferably 300 μm. On the other hand, the upper limit of the average thickness T of the speaker diaphragm is preferably 800 μm, and more preferably 650 μm. When the average thickness T is less than the lower limit, rigidity of the speaker diaphragm may be insufficient, and/or it may be difficult to form the speaker diaphragm by the injection molding. Conversely, when the average thickness T exceeds the upper limit, the speaker diaphragm may become unduly heavy. It is to be noted that the "average thickness" as referred to herein means an average value of thicknesses at 10 arbitrary points.

Examples of the thermoplastic resin include a liquid crystal polymer, polystyrene, a fluororesin, a polycarbonate, a polysulfone, a polyether sulfone, a polyacetal, polyethylene terephthalate, polybutylene terephthalate, a polyamide, a polyimide, acrylonitrile-butadiene-styrene, and the like. Of these, the thermoplastic resin is preferably the liquid crystal polymer, which has superior flowability in the cavity of the die in the case of forming the speaker diaphragm by injection molding, with the molecular orientation being easily controllable.

In the speaker diaphragm, the molecular orientation of the thermoplastic resin, the anisotropy of the elastic modulus due to the molecular orientation, and the like are adjusted by the polyolefin. Examples of the polyolefin include polyethylene, polypropylene, polybutene, polymethylpentene, polyisobutylene, an ethylene-propylene copolymer, an ethylene-vinyl acetate copolymer, and the like. Of these, the polyolefin is preferably polymethylpentene, which has superior flowability in the cavity of the die, and is low in density with a bulky side chain, thereby enabling facilitation of weight reduction of the speaker diaphragm.

With respect to the speaker diaphragm, a combination in which the thermoplastic resin is the liquid crystal polymer and the polyolefin is polymethylpentene is particularly preferable. According to this combination, the liquid crystal polymer easily constitutes the sea phase 1a, and polymethylpentene easily constitutes the island phases 1b. Furthermore, according to this combination, since the liquid crystal polymer has better flowability than polymethylpentene in the cavity of the die, it is considered that a proportion of the liquid crystal polymer in the skin layers tends to be greater than a proportion of the liquid crystal polymer in the core layer. Thus, with respect to the speaker diaphragm, when a proportion of polymethylpentene in the skin layers is comparatively reduced, it is considered that a change in material thickness resulting from shrinkage in molding of polymethylpentene is easily suppressed. Moreover, when the speaker diaphragm has the combination in which the thermoplastic resin is the liquid crystal polymer and the polyolefin is polymethylpentene, the island phases 1b are more easily scattered in the surface layers in a radial form, as described later. As a result, it is thought that with respect to the speaker diaphragm, weight reduction is promoted, and the anisotropy of the elastic modulus resulting from the liquid crystal polymer can be easily adjusted by the island phases 1b. In addition, since polymethylpentene has superior transparency, contrast between the sea phase 1a and the island phases 1b is enhanced, and therefore the sea phase 1a and the island phases 1b are easily confirmed visually. In other words, due to thus causing phase separation into the two phase types, characteristics arising from the sea-island phase structure can be utilized, unlike a single phase being in a miscible state in a molecular order.

The lower limit of a number average molecular weight (Mn) of the liquid crystal polymer is preferably 3,000, and more preferably 10,000. On the other hand, the upper limit of the Mn is preferably 100,000, and more preferably 80,000. When the Mn is less than the lower limit, the rigidity of the speaker diaphragm may be insufficient. Conversely, when the Mn exceeds the upper limit, moldability by the injection molding may be insufficient. It is to be noted that "number average molecular weight (Mn)" as referred to herein means a polystyrene-equivalent value determined by gel permeation chromatography.

The lower limit of the Mn of polymethylpentene is preferably 5,000, and more preferably 15,000. On the other hand, the upper limit of the Mn is preferably 1,000,000, and more preferably 500,000. When the Mn is less than the lower limit, the rigidity of the speaker diaphragm may be insufficient. Conversely, when the Mn exceeds the upper limit, the moldability by the injection molding may be insufficient. It is to be noted that with regard to the speaker diaphragm, in light of ease in increasing the proportion of the liquid crystal polymer in the surface layers, the Mn of polymethylpentene is preferably greater than the Mn of the liquid crystal polymer.

The lower limit of a content of the polyolefin with respect to 100 parts by mass of the thermoplastic resin in the base layer 1 (i.e., the speaker diaphragm) is preferably 30 parts by mass, more preferably 40 parts by mass, and still more preferably 50 parts by mass. On the other hand, the upper limit of the content is preferably 80 parts by mass, more preferably 70 parts by mass, and still more preferably 60 parts by mass. When the content is less than the lower limit, it may be difficult to adjust the anisotropy of the elastic modulus resulting from the thermoplastic resin. Conversely, when the content exceeds the upper limit, the rigidity of the speaker diaphragm may be insufficient, and/or it may be difficult to uniformly disperse the island phases 1b in the sea phase 1a.

The lower limit of a content of the polyolefin in the base layer 1 is preferably 20% by mass, and more preferably 30% by mass. On the other hand, the upper limit of the content of the polyolefin in the base layer 1 is preferably 50% by mass, and more preferably 40% by mass. When the content is less than the lower limit, it may be difficult to adjust the anisotropy of the elastic modulus. Conversely, when the content exceeds the upper limit, the rigidity of the speaker diaphragm may be insufficient, and/or it may be difficult to uniformly disperse the island phases 1b in the sea phase 1a.

The lower limit of a content of the thermoplastic resin in the base layer 1 is preferably 50% by mass, and more preferably 60% by mass. On the other hand, the upper limit of the content of the thermoplastic resin in the base layer 1 is preferably 80% by mass, and more preferably 70% by mass. When the content is less than the lower limit, the rigidity of the speaker diaphragm may be insufficient, and/or it may be difficult to uniformly disperse the island phases 1b in the sea phase 1a. Conversely, when the content exceeds the upper limit, it may not be possible to sufficiently include the polyolefin in the base layer 1; thus, it may be difficult to adjust the anisotropy of the elastic modulus.

A melting point of the polyolefin and a melting point of the thermoplastic resin are preferably substantially equal. The upper limit of a difference between the melting point of the polyolefin and the melting point of the thermoplastic resin is preferably 20° C., and more preferably 15° C. When the difference between the melting points exceeds the upper limit, it may be difficult to form the speaker diaphragm by injection molding. It is to be noted that with regard to the difference between the melting points, a smaller difference is preferable, and the lower limit of the difference can be 0° C.

With regard to the speaker diaphragm, a quality such as the anisotropy of the elastic modulus can be adjusted by including the polyolefin and the thermoplastic resin together. Thus, the speaker diaphragm may have a structure not including fiber components such as reinforcing fibers. On the other hand, in light of preventing cracking and the like, the speaker diaphragm may have a structure including reinforcing fibers. In the case of containing the reinforcing fibers in the speaker diaphragm, polyparaphenylenebenzobisoxazole fibers are preferred as the reinforcing fibers. When the speaker diaphragm contains the polyparaphenylenebenzobisoxazole fibers, weight reduction can be achieved, and unintended cracking can be easily and certainly prevented.

In the case of the speaker diaphragm containing the polyparaphenylenebenzobisoxazole fibers, a content of the polyparaphenylenebenzobisoxazole fibers with respect to 100 parts by mass of the thermoplastic resin can be, for example, 5 parts by mass or more and 40 parts by mass or less.

It is to be noted that the speaker diaphragm may contain other component(s), such as a coloring agent, an ultraviolet ray-absorbing agent, and/or the like, within a range not leading to impairment of the effects of the present disclosure.

In the speaker diaphragm, the island phases 1b are preferably present in the surface layers in the radial form. In the case in which the island phases 1b are present in the surface layers in the radial form, the island phases may radially extend, or may be radially scattered as shown in FIGS. 1 and 2. More specifically, each of a plurality of the island phases 1b dispersed in the circumferential direction may extend in an elongated form in a radial direction of the speaker diaphragm, or the plurality of the island phases 1b, being in a scattered form, may be arranged in the radial form as a whole. In the speaker diaphragm, the form of the island phases 1b in the surface layers can be regulated by controlling the flowability of the polyolefin and the thermoplastic resin in the cavity of the die. In the speaker diaphragm, in the case in which the island phases 1b radially extend in the surface layers, a difference between the elastic modulus in the radial direction and the elastic modulus in the circumferential direction tends to be comparatively large; thus, the anisotropy of the elastic modulus tends to increase. On the other hand, in the case in which the island phases 1b are radially scattered in the surface layers, the anisotropy of the elastic modulus due to the molecular orientation of the thermoplastic resin tends to decrease in the speaker diaphragm. It is to be noted that in the case in which the speaker diaphragm has the skin layers and the core layer, the "surface layers" as referred to herein mean the skin layers. Furthermore, in the case in which the speaker diaphragm does not have either of the skin layers or the core layer, the "surface layers" as referred to herein mean, for example, regions lying 20 µm or less in depth from each of a face on the front side and a face on the back side of the speaker diaphragm.

Next, a method of producing the speaker diaphragm will be described. The method of producing the speaker diaphragm includes a step (injection-molding step) of injection molding a resin composition (diaphragm-forming material) containing a first polymer and a second polymer which are immiscible with respect to each other. The first polymer is a polyolefin, and the second polymer is a thermoplastic resin.

Figure 3:
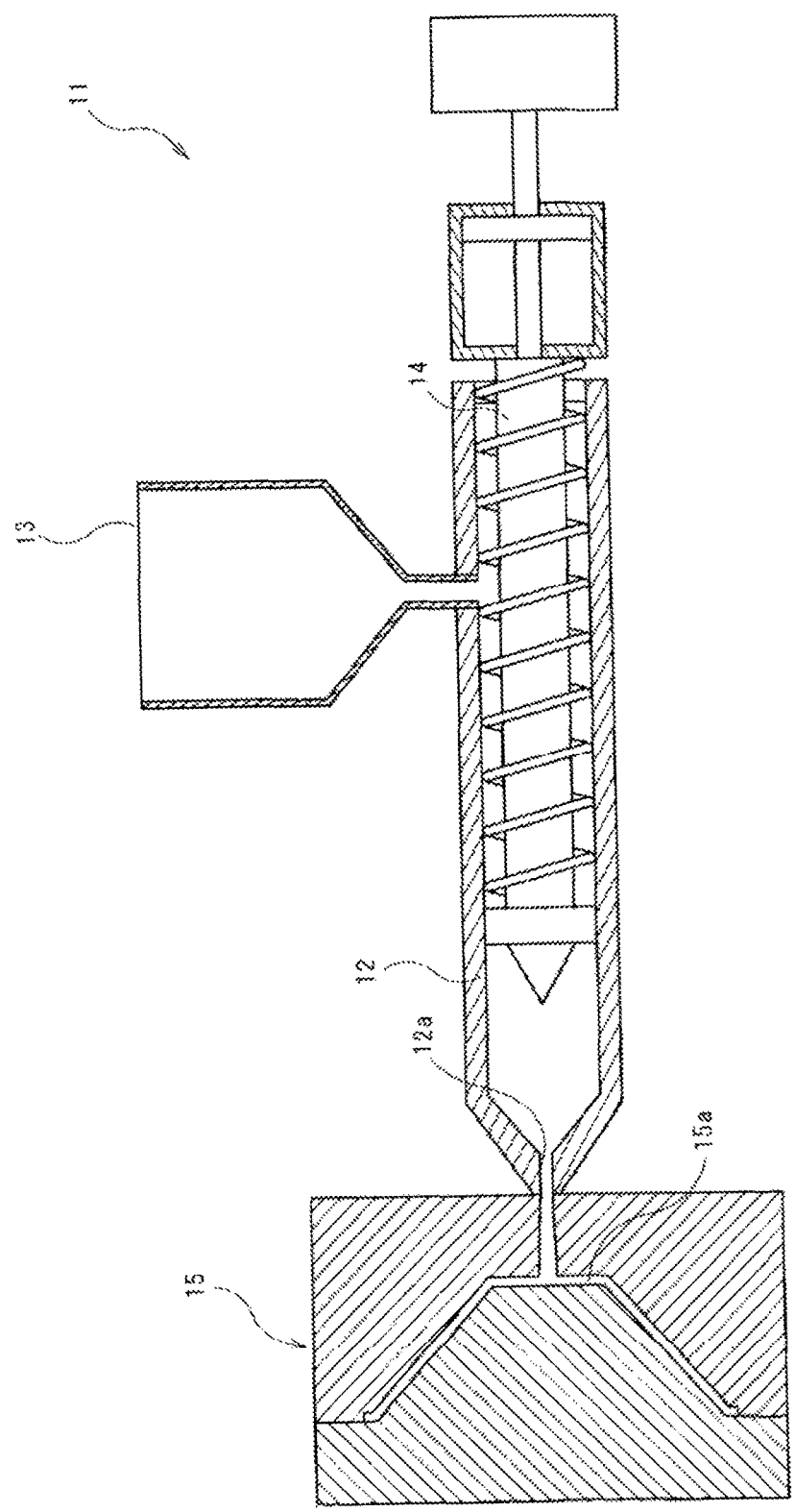
FIG. 3 is a schematic view illustrating a production apparatus for the speaker diaphragm in FIG. 1.

For example, the injection-molding step can be conducted using an injection molding apparatus 11 shown in FIG. 3. The injection molding apparatus 3 has: a cylinder 12 which has a nozzle 12a at a tip thereof; a hopper 13 which is connected to the cylinder 12, and into which the diaphragm-forming material is charged; a screw 14 which is mounted inside the cylinder 12; and a mold 15, having formed therein a cavity 15a which communicates with an opening of the nozzle 12a. The cavity 15a has a shape being an inversion of that of the speaker diaphragm. A part of the cavity 15a which corresponds to the bottom of the speaker diaphragm communicates with the opening of the nozzle 12a. In the injection-molding step, the cavity 15a is radially filled, from the part corresponding to the bottom of the speaker diaphragm, with a melt of the diaphragm-forming material. Furthermore, in the injection-molding step, after the filling with the melt, the cavity 15a is cooled, whereby the melt is hardened. A molded product obtained by hardening the melt is configured as the speaker diaphragm.

A cylinder temperature in the injection-molding step is preferably set depending on the melting point of the polyolefin. For example, in the case in which the polyolefin is polymethylpentene, the lower limit of the cylinder temperature is preferably 300° C., and more preferably 310° C. On the other hand, the upper limit of the cylinder temperature is preferably 350° C., and more preferably 320° C. When the cylinder temperature is less than the lower limit, the flowability of the polyolefin may be insufficient, and thus it may be difficult to appropriately control, by the polyolefin, the anisotropy of the elastic modulus of the speaker diaphragm to be obtained. Conversely, when the cylinder temperature exceeds the upper limit, efficiency of producing the speaker diaphragm may be inferior.

Due to the first polymer and the second polymer phase-separating from each other in the speaker diaphragm, the anisotropy of the elastic modulus due to the molecular orientation of one of either the first polymer or the second polymer can be controlled by the other one of either the first polymer or the second polymer.

In the speaker diaphragm, the anisotropy of the elastic modulus due to the molecular orientation of the thermoplastic resin constituting the sea phase 1a can be controlled by the island phases 1b, which are interspersed in the sea phase 1a. Furthermore, in the speaker diaphragm, the anisotropy of the elastic modulus is easily confirmed visually due to the sea phase 1a and the island phases 1b, and improving designability is enabled due to interspersing the island phases 1b in the sea phase 1a.

The method of producing the speaker diaphragm enables easily producing the speaker diaphragm of the one embodiment of the present invention.

The embodiments described above do not restrict the constituent features of the present disclosure. Therefore, constituent elements of each part of the above-described embodiments may be omitted, replaced, or added based on the description in the present specification and common technical knowledge, and such omission, replacement, and addition should be construed as falling within the scope of the present disclosure.

In the speaker diaphragm, the polyolefin may constitute a sea phase, and a thermoplastic resin being immiscible with the polyolefin may constitute island phases being interspersed in the sea phase. In this case, in the speaker diaphragm, the anisotropy of the elastic modulus due to the molecular orientation of the polyolefin can be adjusted by the thermoplastic resin. Further, in this case, a content of the polyolefin in the base layer can be set similarly to the content of the thermoplastic resin in the base layer 1 of the one embodiment of the present invention. Moreover, a content of the thermoplastic resin with respect to 100 parts by mass of the polyolefin can be set similarly to the content of the polyolefin with respect to 100 parts by mass of the thermoplastic resin in the one embodiment of the present invention. Furthermore, in the case of the speaker diaphragm further containing the polyparaphenylenebenzobisoxazole fibers, a content of the polyparaphenylenebenzobisoxazole fibers with respect to 100 parts by mass of the polyolefin can be set similarly to the content of the polyparaphenylenebenzobisoxazole fibers with respect to 100 parts by mass of the thermoplastic resin in the one embodiment of the present invention.

Hereinafter, the present disclosure will be further described in detail by way of Examples, but the present disclosure is not to be interpreted as limited based on the following Examples.

Example No. 1

Figure 4:
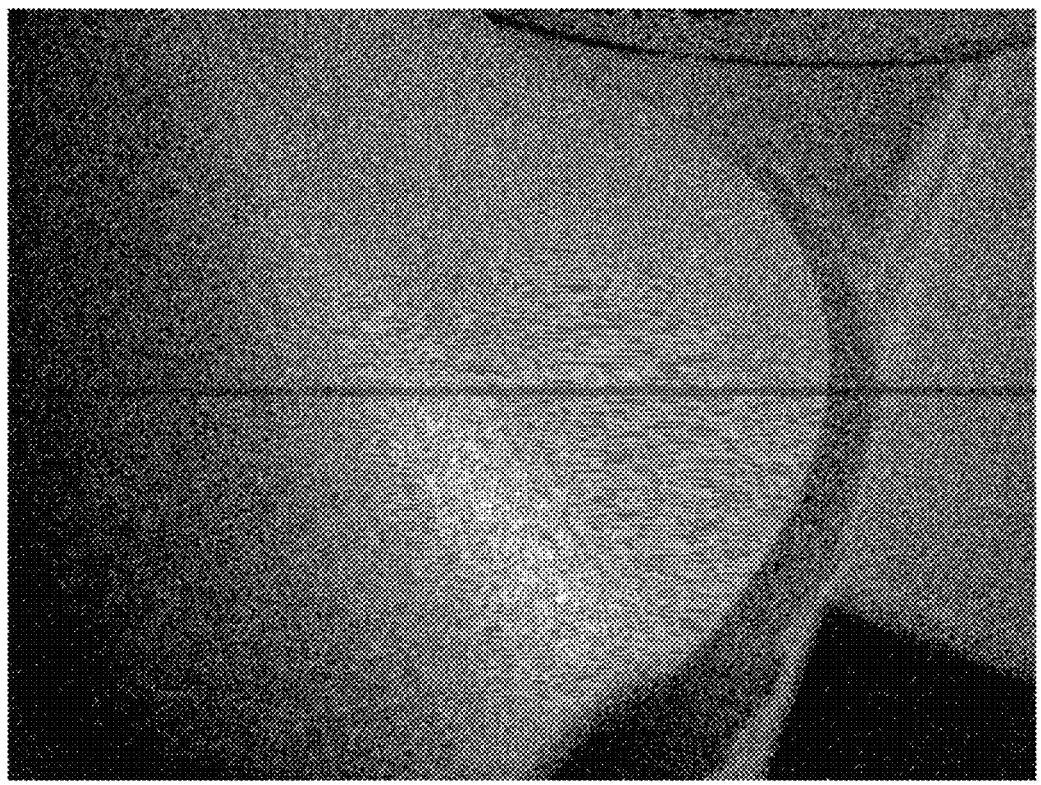
FIG. 4 is a photographic image taken from a back side of speaker diaphragm No. 1.

Cone-shaped speaker diaphragm No. 1, being constituted from a single-layer body of the base layer, and having an average thickness of 450 μm, was produced by injection molding a diaphragm-forming material constituted from: a liquid crystal polymer as the thermoplastic resin; and polymethylpentene as the polyolefin being immiscible with the thermoplastic resin. As the liquid crystal polymer, "A8100," manufactured by Ueno Fine Chemicals Industry, Ltd. and having a melting point of 220° C., was used, and as polymethylpentene, "RT31," produced by Mitsui Chemical, Inc. and having a melting point of 232° C., was used. In No. 1, a content of polymethylpentene with respect to 100 parts by mass of the liquid crystal polymer was set to 56 parts by mass. A photograph of this speaker diaphragm taken from the back side is shown in FIG. 4. The speaker diaphragm had a sea phase constituted from the liquid crystal polymer, and island phases constituted from polymethylpentene and being interspersed in the sea phase. The speaker diaphragm had a pair of skin layers and a core layer being disposed between the skin layers, and as illustrated in FIG. 4, the island phases were radially scattered in the surface layers (skin layers).

Example No. 2

Speaker diaphragm No. 2, having an average thickness of 500 um, was produced similarly to No. 1, except that the content of polymethylpentene with respect to 100 parts by mass of the liquid crystal polymer was set to 100 parts by mass. The speaker diaphragm had a sea phase constituted from the liquid crystal polymer, and island phases constituted from polymethylpentene and being interspersed in the sea phase. The speaker diaphragm had a pair of skin layers and a core layer being disposed between the skin layers, and the island phases were radially scattered in the surface layers (skin layers).

Example No. 3

Figure 5:
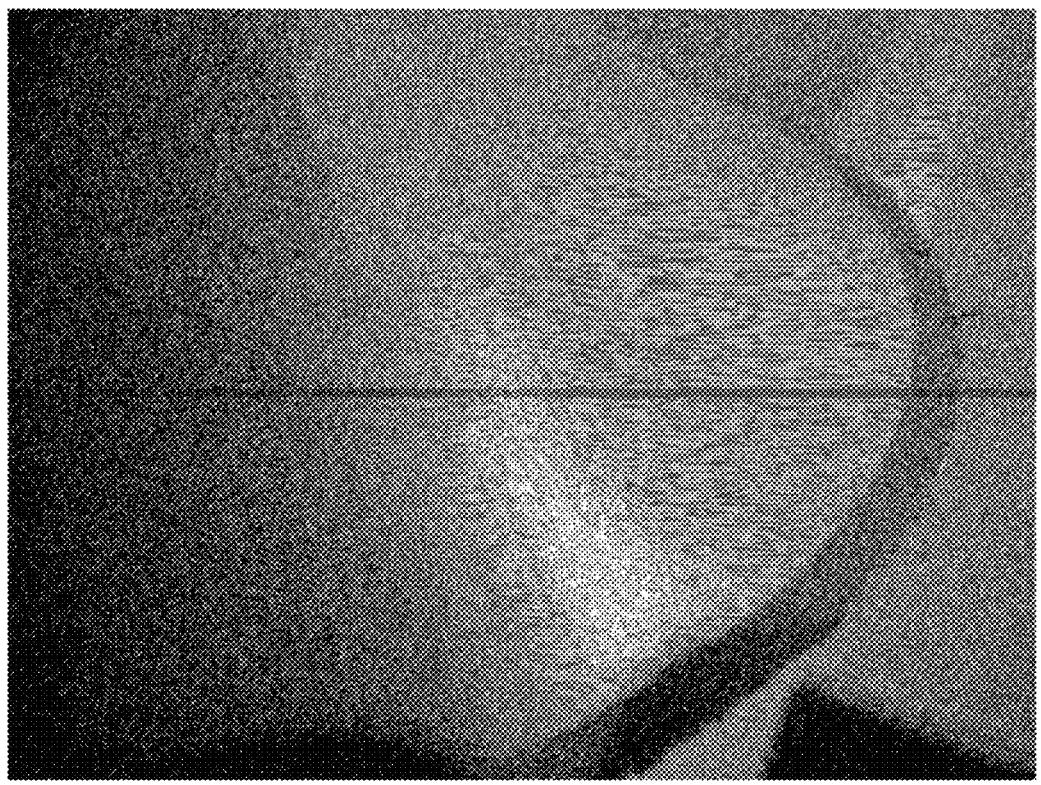
FIG. 5 is a photographic image taken from a back side of speaker diaphragm No. 3.

Speaker diaphragm No. 3, having an average thickness of 500 was produced similarly to No. 1, except that a diaphragm-forming material being constituted from solely the liquid crystal polymer ("A8100," produced by Ueno Fine Chemicals Industry, Ltd.) having a melting point of 220° C. was used. A photograph of this speaker diaphragm taken from the back side is shown in FIG. 5. As illustrated in FIG. 5, the liquid crystal polymer was radially oriented in the surface layers.

Example No. 4

Speaker diaphragm No. 4, having an average thickness of 390 μm, was produced similarly to No. 1, except that a diaphragm-forming material being constituted from solely polymethylpentene ("RT31," produced by Mitsui Chemical, Inc.) having a melting point of 232° C. was used.

The density (g/cm$^3$) of each of the speaker diaphragms No. 1 to No. 4 was measured. The density was determined by: cutting out a test piece being 5 mm×40 mm; then determining a volume of the test piece by calculating an average thickness based on average thickness values at three arbitrary points; and dividing a weight of the test piece by the calculated volume. The measurement results are shown in Table 1.

A storage elastic modulus (GPa) in each of a radial direction and a circumferential direction was measured at 250 Hz and 1,000 Hz for each of the speaker diaphragms No. 1 to No. 4. A rectangular sample having a width of 5 mm, a length of 40 mm, and a thickness of 0.5 mm was cut out from each of the speaker diaphragms No. 1 to No. 4, and a dynamic viscoelasticity measurement apparatus ("DMA+ 150") manufactured by Metravib was used to measure the storage elastic modulus at 23±2° C. in a pulling mode. The measurement results are shown in Table 1.

TABLE 1

| | Content of poly methylpentene with respect to 100 parts by mass of liquid crystal polymer (parts by mass) | Density (g/cm$^3$) | Storage elastic modulus (GPa) | | | | | |
|---|---|---|---|---|---|---|---|---|
| | | | 250 Hz | | | 1,000 Hz | | |
| | | | radial direction | circumferential direction | radial direction/ circumferential direction | radial direction | circumferential direction | radial direction/ circumferential direction |
| No. 1 | 56 | 1.07 | 4.54 | 2.33 | 1.95 | 5.97 | 2.92 | 2.04 |
| No. 2 | 100 | 1.15 | 6.51 | 2.60 | 2.50 | 8.66 | 3.28 | 2.64 |

TABLE 1-continued

| | Content of poly methylpentene with respect to 100 parts by mass of liquid crystal polymer (parts by mass) | Density (g/cm³) | Storage elastic modulus (GPa) | | | | | |
|---|---|---|---|---|---|---|---|---|
| | | | 250 Hz | | | 1,000 Hz | | |
| | | | radial direction | circumferential direction | radial direction/ circumferential direction | radial direction | circumferential direction | radial direction/ circumferential direction |
| No. 3 | 0 | 1.27 | 8.48 | 3.28 | 2.59 | 11.60 | 4.33 | 2.68 |
| No. 4 | — | 0.91 | 1.81 | 1.86 | 0.97 | 2.23 | 2.31 | 0.97 |

Each of the speaker diaphragms No. 1 and No. 2 has the island phases interspersed in the sea phase, with the island phases being radially scattered in the surface layers; therefore, adjusting the anisotropy of the elastic modulus to be less is enabled by reducing the ratio of the storage elastic modulus in the circumferential direction to the storage elastic modulus in the radial direction, as shown in Table 1, compared with the speaker diaphragm No. 3, which is constituted solely from the liquid crystal polymer. Moreover, comparison between the speaker diaphragms No. 1 and No. 2 indicates that adjusting the anisotropy of the elastic modulus to be less has been enabled in the speaker diaphragm No. 1, in which the content of polymethylpentene is lower. Furthermore, due to using polymethylpentene as the polyolefin, the speaker diaphragms No. 1 and No. 2 enable achieving a reduction in weight compared to the speaker diaphragm No. 3, which is constituted from the liquid crystal polymer.

As described above, according to the speaker diaphragm of the one embodiment of the present invention, the anisotropy is easily controlled; thus, the speaker diaphragm can be suitably used as a cone-shaped diaphragm.

What is claimed is:

1. A speaker diaphragm comprising:
a first polymer; and
a second polymer, wherein
the first polymer and the second polymer undergo phase separation,
the first polymer is a polyolefin,
the second polymer is a thermoplastic resin being immiscible with the polyolefin,
one of either the polyolefin or the thermoplastic resin constitutes a sea phase, and another one of either the polyolefin or the thermoplastic resin constitutes island phases being interspersed in the sea phase, and
the speaker diaphragm is devoid of fiber components, and the island phases are scattered in surface layers in a radial form.

2. The speaker diaphragm according to claim 1, wherein a difference between a melting point of the polyolefin and a melting point of the thermoplastic resin is 20° C. or less.

3. The speaker diaphragm according to claim 2, wherein the polyolefin is polymethylpentene.

4. The speaker diaphragm according to claim 3, wherein the thermoplastic resin is a liquid crystal polymer.

5. The speaker diaphragm according to claim 4, further comprising: polyparaphenylenebenzobisoxazole fibers which are dispersed in at least one of the polyolefin and the thermoplastic resin.

6. The speaker diaphragm according to claim 5, wherein the speaker diaphragm has a cone shape.

7. The speaker diaphragm according to claim 4, wherein a number average molecular weight of the polymethylpentene is greater than a number average molecular weight of the liquid crystal polymer.

8. A speaker diaphragm comprising:
a first polymer; and
a second polymer, wherein
the first polymer and the second polymer undergo phase separation,
the first polymer is a polyolefin,
the second polymer is a thermoplastic resin being immiscible with the polyolefin,
one of either the polyolefin or the thermoplastic resin constitutes a sea phase, and another one of either the polyolefin or the thermoplastic resin constitutes island phases being interspersed in the sea phase,
the polyolefin is polymethylpentene and the thermoplastic resin is a liquid crystal polymer, and
the liquid crystal polymer constitutes the sea phase, the polymethylpentene constitutes the island phases, and the island phases are scattered in surface layers in a radial form.

9. The speaker diaphragm according to claim 8, wherein a difference between a melting point of the polyolefin and a melting point of the thermoplastic resin is 20° C. or less.

10. The speaker diaphragm according to claim 8, further comprising: polyparaphenylenebenzobisoxazole fibers which are dispersed in at least one of the polyolefin and the thermoplastic resin.

11. The speaker diaphragm according to claim 8, wherein the speaker diaphragm has a cone shape.

12. The speaker diaphragm according to claim 8, wherein a number average molecular weight of the polymethylpentene is greater than a number average molecular weight of the liquid crystal polymer.

* * * * *